United States Patent [19]

Katahara

[11] Patent Number: 5,448,437
[45] Date of Patent: Sep. 5, 1995

[54] VOICE COIL MOTOR FOR DISK DRIVE

[75] Inventor: Naotoshi Katahara, Kawasaki, Japan

[73] Assignee: Fujitsu Limited, Kawasaki, Japan

[21] Appl. No.: 991,791

[22] Filed: Dec. 17, 1992

[30] Foreign Application Priority Data

Dec. 17, 1991 [JP] Japan .................. 3-333677

[51] Int. Cl.⁶ .............. G11B 5/55; G11B 5/54
[52] U.S. Cl. .................... 360/106; 360/105
[58] Field of Search ............ 360/105, 106, 97.01, 360/97.02, 104

[56] References Cited

U.S. PATENT DOCUMENTS

| | | | |
|---|---|---|---|
| 4,145,725 | 3/1979 | Wallis . | |
| 4,331,991 | 5/1982 | Morehouse et al. . | |
| 4,760,480 | 7/1988 | Takekado | 360/106 |
| 4,766,510 | 8/1988 | Okita et al. | 360/106 |
| 4,775,908 | 10/1988 | Ycas | 360/106 |
| 4,805,055 | 2/1989 | Wright . | |
| 4,823,219 | 4/1989 | Ueda et al. | 360/106 |
| 4,835,643 | 5/1989 | Schulze | 360/106 |
| 4,853,808 | 8/1989 | Lutz | 360/106 |
| 4,868,432 | 9/1989 | Frandsen | 360/106 |
| 4,916,342 | 4/1990 | Hirano et al. | 360/106 |
| 4,937,693 | 6/1990 | Connolly et al. | 360/106 |
| 4,941,062 | 7/1990 | Yoshioka | 360/106 |
| 4,992,684 | 2/1991 | Matsui | 360/106 |
| 5,041,935 | 8/1991 | Aruga et al. . | |
| 5,050,026 | 9/1991 | Goss . | |
| 5,119,253 | 6/1992 | Kotani | 360/106 |

FOREIGN PATENT DOCUMENTS

| | | |
|---|---|---|
| 0355692 | 2/1990 | European Pat. Off. . |
| 386054 | 4/1991 | Japan . |
| 3122875 | 5/1991 | Japan . |
| 3178546 | 8/1991 | Japan . |

Primary Examiner—Stuart S. Levy
Assistant Examiner—Allen Cao
Attorney, Agent, or Firm—Greer, Burns & Crain, Ltd.

[57] ABSTRACT

A voice coil motor for a disk drive comprising a voice coil motor for driving an actuator, the voice coil motor including a coil (103) which has a first group of three sides (104, 105 and 108) that are located to be parallel with the rotation plane of the actuator, so as to traverse a vertical magnetic field formed by the voice coil motor; and a second group of three sides (106, 107 and 109) that are located to be perpendicular to the rotation plane of the actuator, so as to traverse a horizontal magnetic field formed by the voice coil motor.

Preferably, a pair of parallel sides (104, 105) of the first group of three sides and another pair of parallel sides (106, 107) are connected to each other at approximately right angles, respectively.

7 Claims, 13 Drawing Sheets

VOICE COIL MOTOR FOR DISK DRIVE

BACKGROUND OF THE INVENTION

1. Field of the Invention

The present invention relates to a disk drive having a voice coil motor for driving an actuator, which forces a magnetic head to move rotatably on the surface of a recording medium such as a disk, in order to perform read/write operations. More specifically, the present invention relates to an improvement of a coil structure in the voice coil motor for the disk drive, which allows the actuator to move efficiently.

2. Description of the Related Art

There is recently a tendency to demand, in a computer system, a transfer of large amounts of data at high speed, and therefore, an auxiliary storage device such as a magnetic disk drive is also required to transfer large amounts of data at high speed to exchange data with a host device. To meet this requirement, it is essential for magnetic disk drive, etc., to have a recording medium, e.g., a disk, having a high density recording surface (e.g., a track pitch thereof is less than 10 $\mu$m).

A storage device such as a magnetic disk drive executes a so-called head seek operation for moving a head to a designated target track (target cylinder) position from a current track (cylinder) position on a disk by controlling an actuator. When the head is positioned to the designated target track position, a data writing or reading operation is carried out through the head. Such a head positioning control is performed using a digital servo system. In this case, it is also required that the actuator should respond to the digital servo system at high speed and should be controlled efficiently with lower power consumption.

A driving source, e.g. a voice coil motor for driving a conventional actuator for a disk drive will be described with reference to the accompanying drawings.

FIG. 1 is a perspective view showing a construction of a main part of a voice coil motor using a flat coil. FIG. 2 is a schematic front view of FIG. 1 for explaining the operation of the construction shown in FIG. 1. FIG. 3 shows a construction of a main part of a voice coil motor using a square coil. FIG. 4 is a schematic side view of FIG. 3 for explaining the operation of the construction shown in FIG. 3.

First, a voice coil motor using a flat coil will be described with reference to FIGS. 1 and 2. In these figures, a first magnet 3 and a second magnet 4 are placed on a surface of a lower yoke 1 facing an upper yoke 2. Similarly, a third magnet 5 and a fourth magnet 6 are placed on a surface of the upper yoke 2 facing the lower yoke 1 (the third and fourth magnets are not shown in FIG. 1).

The lower yoke 1, upper yoke 2, first magnet 3, second magnet 4, third magnet 5, and fourth magnet 6 constitute a magnetic assembly. A magnetic air gap 7 is created between the first magnet 3 and second magnet 4, and between the third magnet 5 and fourth magnet 6.

Then, a flat coil 8, which is mounted on an actuator that is not shown, is arranged in the magnetic air gap 7.

Next, the operation of the foregoing construction will be described. When an electric current flows through the coil 8, a thrust, i.e., a moving force occurs at the coil 8 arranged in the magnetic air gap 7. Thus, the actuator moves in either of two arrow directions in FIG. 1, by means of such a thrust.

Further, a voice coil motor using a square coil will be described with reference to FIGS. 3 and 4. A yoke 11 comprises a lower yoke 12 that is mounted on a base portion of a disk drive, a vertical yoke 13 extending upward from the lower yoke 12, a middle yoke 14 extending from the substantial center of the vertical yoke 13 in parallel with the lower yoke 12 and in the same direction as the lower yoke 15, and an upper yoke 12 extending from the upper end of the vertical yoke 13 in parallel with the lower yoke 12 and in the same direction as the lower yoke 12. A first magnet 16 is placed on the surface of the lower yoke 12 facing the middle yoke 14. A second magnet 17 is placed on the surface of the upper yoke 15 facing the middle yoke 14.

The lower yoke 12, vertical yoke 13, middle yoke 14, and first magnet 16 constitute a first magnetic assembly. A first magnetic air gap 18 is created between the first magnet 16 and the middle yoke 14. Similarly, the middle yoke 14, vertical yoke 13, upper yoke 15, and second magnet 17 make up a second magnetic assembly. A second magnetic air gap 19 is created between the second magnet 17 and middle yoke 14.

20 denotes a square coil, which is composed of a first portion 21 arranged in the first magnetic air gap 18, a second portion 22 arranged in the second magnetic air gap, and third and fourth portions 23 and 24 that communicate with the first portion 21 and the second portion 22.

Next, the operation of the foregoing construction will be described. When a control circuit of a servo system that is not shown supplies current to a coil 20, a thrust occurs at the first portion 21 arranged in the first magnetic air gap 18 and at the second portion 22 arranged in the second magnetic air gap 19. An actuator moves linearly in either of two arrow directions in FIG. 3.

As described above, a disk drive having a larger storage capacity and making an access at high speed has been required in recent years. Such a larger storage capacity forces the number of disks or heads to be increased, as well as a weight of an actuator. Further, due to the increase of a weight of the actuator, a voice coil motor is required to provide a larger driving force. Furthermore, in order to increase an access speed, a voice coil motor having a larger driving force is necessitated. As strategies for increasing the driving force of a voice coil motor, the following methods are considered;

(1) Increasing a magnetic field strength of a magnetic assembly
(2) Increasing the length of a coil in a magnetic air gap
(3) Increasing an electric current flowing through a coil.

The above-mentioned method (1) requires larger dimensions of magnets, thereby increasing the whole size of a disk drive. The method (2) requires larger dimensions of coil. The method (3) leads to an increase in power consumption.

On the other hand, when a flat coil 8 described in FIGS. 3 and 4 is utilized, as shown in FIG. 5, a thrust occurs only at about 50% of an overall length of the coil arranged in a magnetic air gap 7 (hatched portions in FIG. 5). Further, when a square coil described in FIGS. 1 and 2 is utilized, as shown in FIG. 6, a first portion 21 and a second portion 22 arranged in a first magnetic air gap and a second magnetic air gap 19 occupies only about 50% of the overall length of the coil. In either case of the above-mentioned prior arts, the coil is not utilized effectively.

SUMMARY OF THE INVENTION

In view of the above problems, the main object of the present invention is to provide a disk drive having a voice coil motor for driving an actuator, which enables the actuator to move at a higher speed to realize a higher data transfer rate.

A further object of present invention is to provide a voice coil for a disk drive, in which a voice coil motor enables an actuator to be controlled with lower power consumption.

A still further object of the present invention is to provide a voice coil for a disk drive in which a coil can be utilized more effectively than that in the prior arts.

To attain the above objects, the voice coil motor for a disk drive according to the present invention includes a voice coil motor which further includes a coil which has a first group of three portions that are located to be parallel with the rotation plane of the actuator, so as to traverse a vertical magnetic field formed by the voice coil motor; and a second group of three portions that are located to be perpendicular to the rotation plane of the actuator, so as to traverse a horizontal magnetic field formed by the voice coil motor.

Preferably, a pair of parallel portion of the first group of three portions and another pair of parallel portions are connected to each other at approximately right angle, respectively. Further, two pairs of parallel portions among total six portions of the coil are constructed to be utilized effectively for the magnetic field.

Further, preferably, a voice coil motor for a disk drive has a first substantially L-shaped coil having a first portion that is mounted on an actuator body to be substantially perpendicular to the rotation radius of an actuator, a second portion that extends from one end of the first portion in substantially the same direction as the rotation radius of the actuator but in the direction of departing from the rotation center of the actuator, a third portion that extends from the other end of the first portion in substantially the same direction as the second portion, a fourth portion that extends from the tip of the second portion substantially perpendicularly to the rotation plane of the actuator, a fifth portion that extends from the tip of the third portion in substantially the same direction as the fourth portion, and a sixth portion that bridges between the tip of the fourth portion and the tip of the fifth portion; a second substantially L-shaped coil having a first portion that is arranged back to back with the first portion of the first coil, a second portion that extends from one end of the first portion to run back to back with the second portion of the first coil, a third portion that extends from the other end of the first portion to run back to back with the third portion of the first coil, a fourth portion that extends from the tip of the second portion in the opposite direction of the fourth portion of the first coil, a fifth portion that extends from the tip of the third portion in the opposite direction of the fifth portion of the first coil, and a sixth portion that bridges between the tips of the fourth and fifth portions; and a magnetic assembly having a first magnetic air gap in which the fourth and fifth portions the first coil are arranged, a second magnetic air gap in which the fourth and fifth portions of the second coil are arranged, and a third magnetic air gap in which the second and third portions of the first coil, and the second and third portions of the second coil are arranged.

Further, preferably, a voice coil motor for a disk drive has a substantially L-shaped first coil having a first portion that is mounted on an actuator body to be substantially perpendicular to the rotation radius of an actuator, a second portion that extends from one end of the first portion in substantially the same direction as the rotation radius of the actuator but in the direction of departing from the rotation center of the actuator substantially, a third portion that extends from the other end of the first portion in substantially the same direction as the second portion, a fourth portion that extends from the tip of the second portion substantially perpendicularly to the rotation plane of the actuator, a fifth portion that extends from the tip of the third portion in substantially the same direction as the fourth portion, and a sixth portion that bridges between the tip of the fourth portion and the tip of the fifth portion a substantially L-shaped second coil having a first portion that is arranged portion by portion with the first portion of the first coil, a second portion that extends from one end of the first portion to run portion by portion with the second portion of the first coil, a third portion that extends from the other end of the first coil to run portion by portion with the third portion of the first coil, a fourth portion that extends from the tip of the second portion in the opposite direction on the fourth portion of the first coil, a fifth portion that extends from the tip of the third portion in the opposite direction of the fifth portion of the first coil, and a sixth portion that bridges between the tips of the fourth and fifth portions; and a magnetic assembly having a first magnetic air gap in which the sixth portion of the first coil is arranged, a second magnetic air gap in which the sixth portion of the second coil is arranged, and a third magnetic air gap in which the second and third portions of the first coil, and the second and portions of the second coil are arranged.

According to the present invention, portions of a coil are arranged in a magnetic air gap for a magnetic assembly and portions and are arranged in a magnetic air gap. Therefore, when a current flows through the coil, a thrust occurs at the portions. Namely, a thrust occurs in four portions of a single coil. Thus, the coil is utilized fully.

Further, in a voice coil motor for the disk drive according to the present invention, a first coil has first to sixth portions. Among them, the fourth and fifth portions are arranged in a first magnetic air gap, and the second and third portions are arranged in the third magnetic air gap.

Furthermore, a second coil also has first to sixth portions. Among time, the fourth and fifth portions are arranged in a second magnetic air gap, while the second and third portions are arranged in a third magnetic air gap.

Thus, four of six portions of each of the coils are arranged in magnetic air gaps. Therefore, a thrust occurs in about 67% of an overall length of each coil. Thus, the coils can be utilized more effectively than in the prior art.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Figure 1:
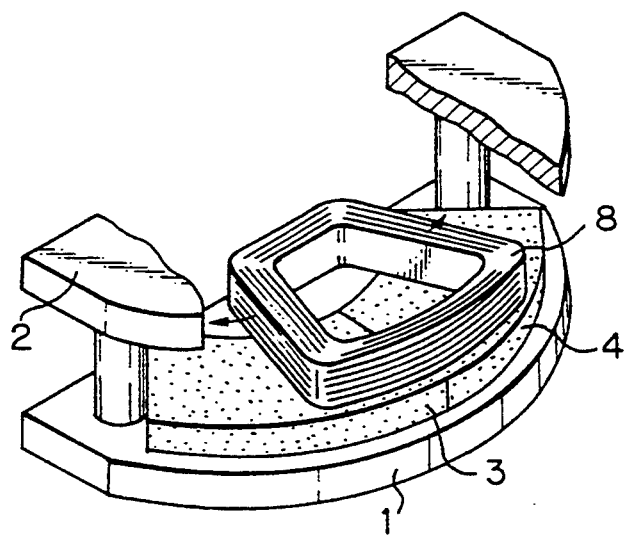
FIG. 1 is a perspective view showing a construction of a main part of a voice coil motor according to a prior art, using a flat coil.
Figure 2:
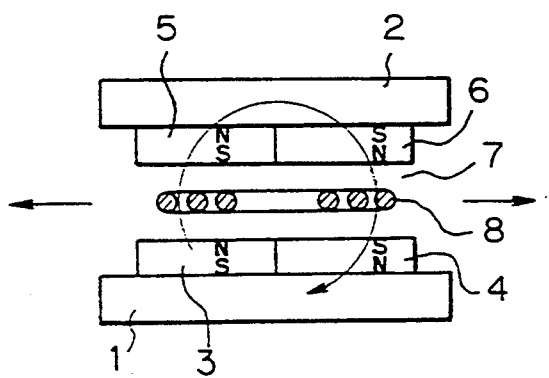
FIG. 2 is a schematic from view of FIG. 1 for explaining the operation of the construction shown in FIG. 1.
Figure 3:
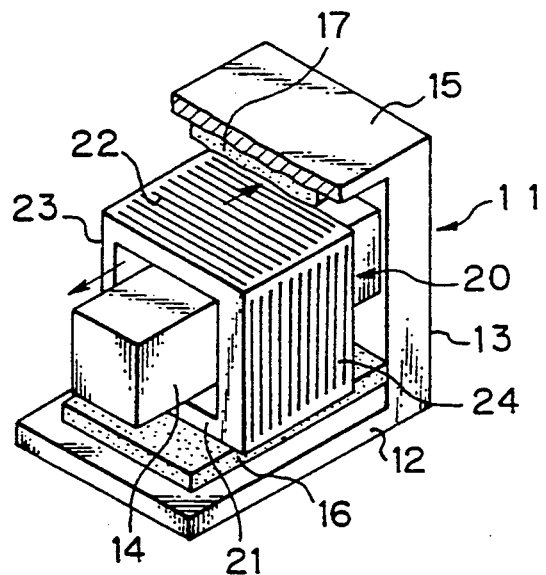
FIG. 3 is a perspective view showing a construction of a main part of a voice coil motor according to another prior art, using a square coil.
Figure 4:
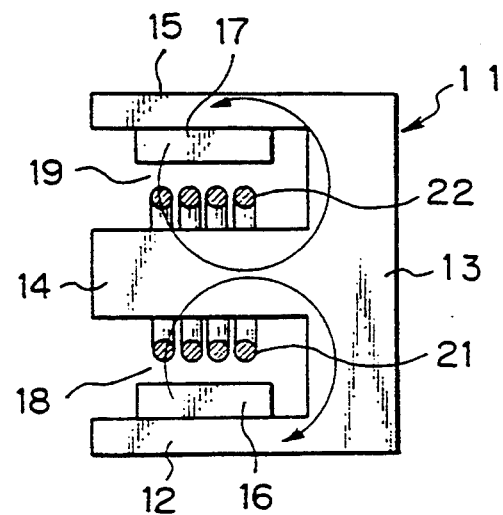
FIG. 4 is a schematic side view of FIG. 3 for explaining the operation of the construction shown in FIG. 3.
Figure 5:
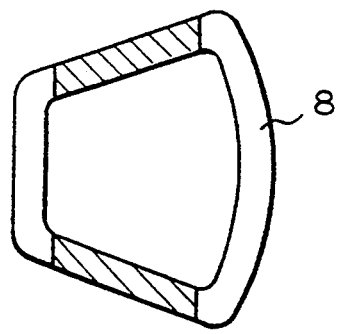
FIG. 5 is a schematic top view for explaining a problem of FIG. 1.
Figure 6:
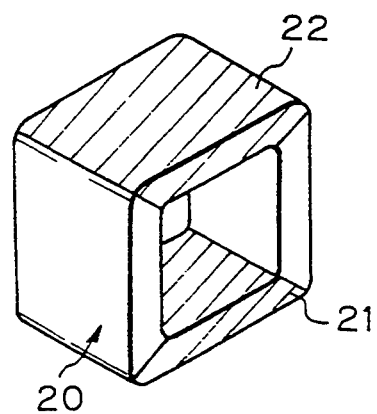
FIG. 6 is a schematic perspective view for explaining a problem of FIG. 3.

FIG. 1 is a schematic view showing an essential embodiment based on the principle according to the present invention.

Figure 7:
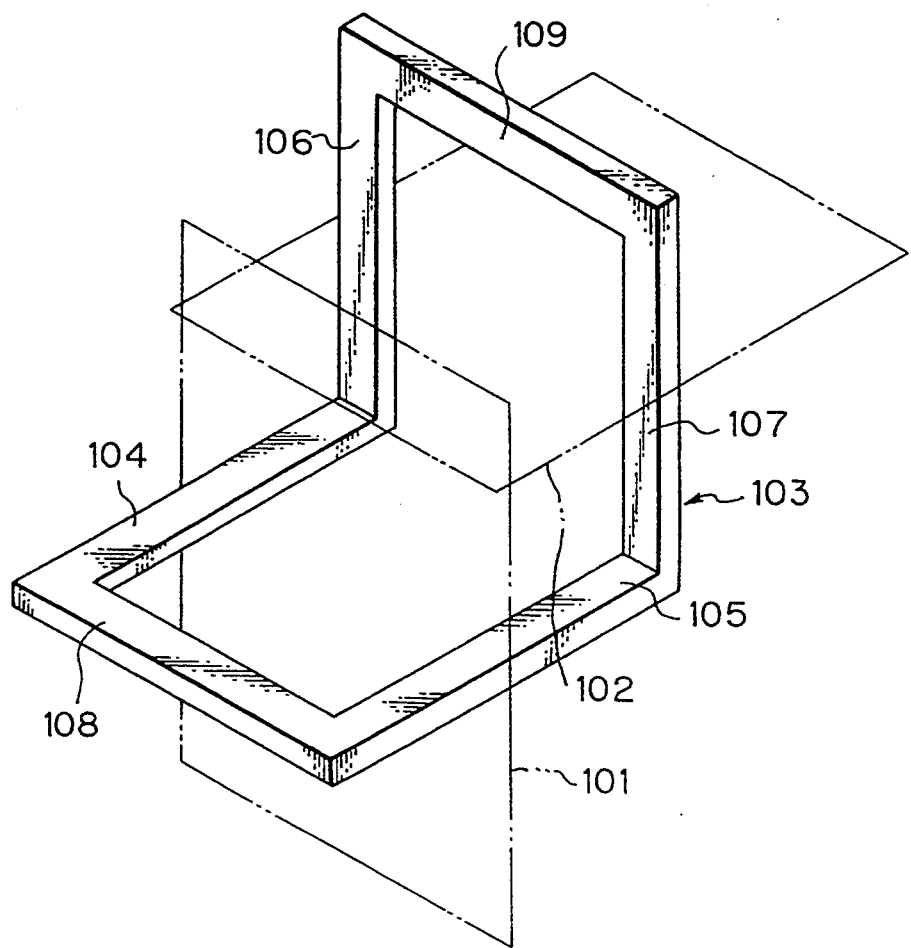
FIG. 7 is a perspective view showing an essential embodiment based on the principle of the present invention.

In FIG. 7, a magnetic assembly is formed including a magnetic air gap 101 perpendicular to a rotation plane of an actuator (will be illustrated in FIG. 9., etc.) and a magnetic air gap 102 parallel with the rotation plane of the actuator.

103 denotes a coil in a voice coil motor, which includes two substantially parallel portions 104 and 105 that are arranged in the magnetic air gap 101 perpendicular to the rotation plane of the actuator, and includes two substantially parallel portions 106 and 107 that are arranged in the magnetic air gap 102 parallel with the rotation plane of the actuator. Portion 108 connects sides 104 and 105 together and side 109 similarly connects sides 106 and 107 together.

In the construction of a voice coil motor for a disk drive according to FIG. 7, portions 104 and 105 of a coil 103 are arranged in a magnetic air gap 101 for a magnetic assembly and portions 106 and 107 are arranged in a magnetic air gap 102. Therefore, when a current flows through the coil 103, a thrust occurs at the portions 104, 105, 106, and 107. In this illustration of principles, the thrust occurs in four portions 104, 105, 106, and 107 of a single coil 103. Thus, the coil can be utilized substantially fully.

In this case, the L-shaped coil with six portions is formed. Thus, four of six portions of the L-shaped coil are arranged in magnetic gaps. Consequently, a thrust occurs in about 67% of an overall length of the coil. Finally, the coil can be utilized more effectively than in the prior arts (50%).

Figure 8:
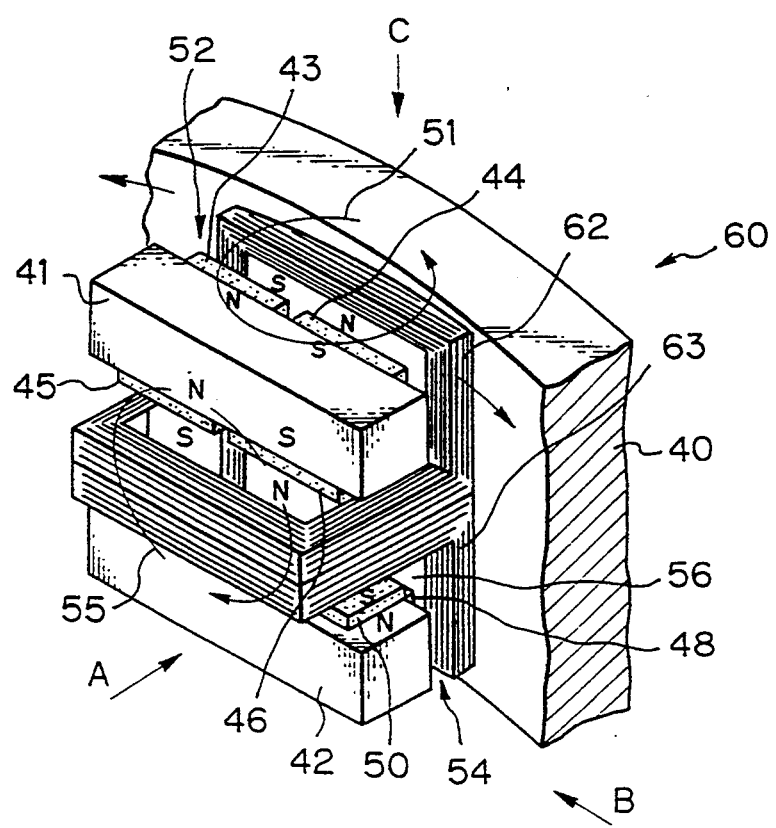
FIG. 8 is a perspective view of a voice coil motor showing a first embodiment according to the present invention.
Figure 9:
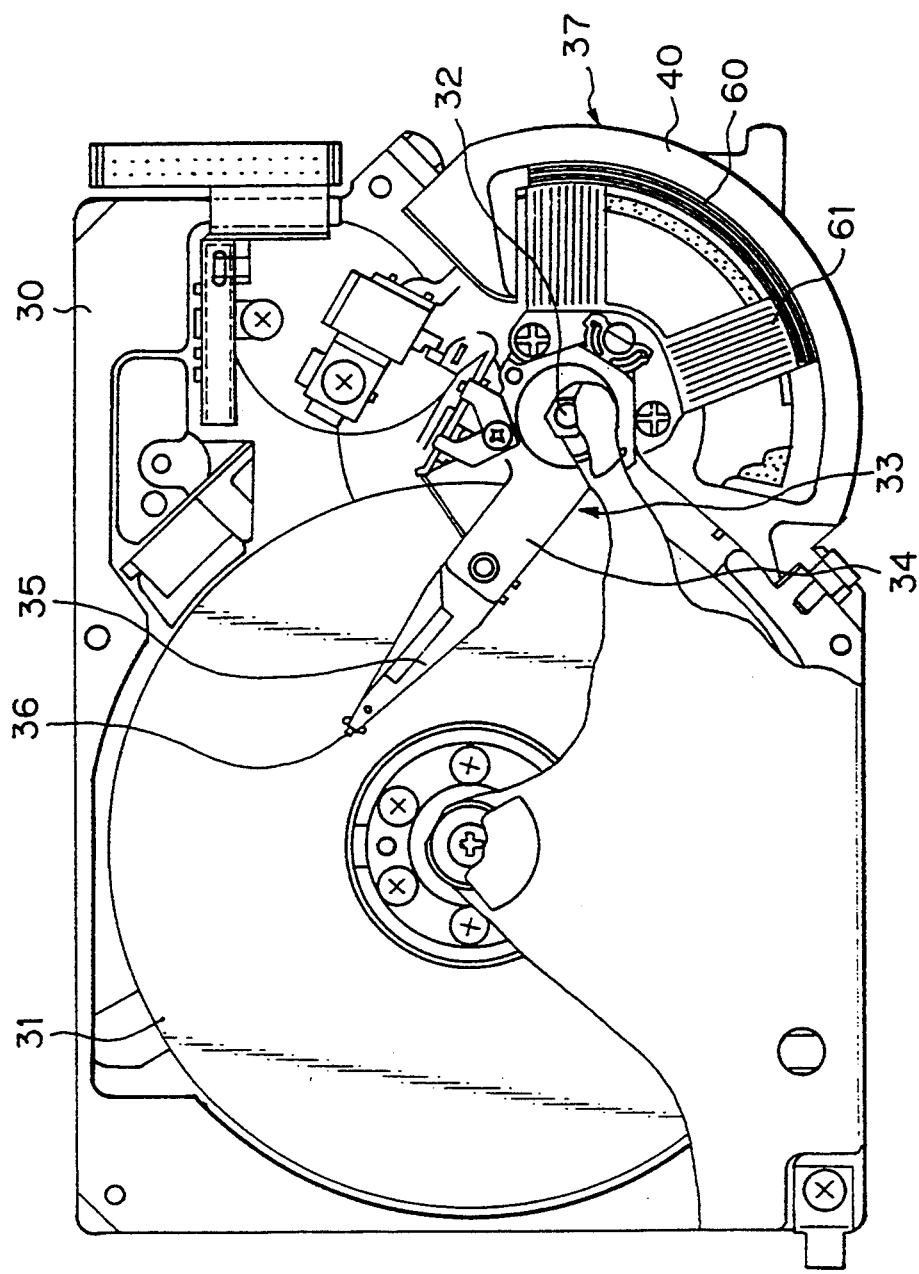
FIG. 9 is a plan view of a magnetic disk drive having a voice coil motor shown in FIG. 8, which is partly cut away.
Figure 10:
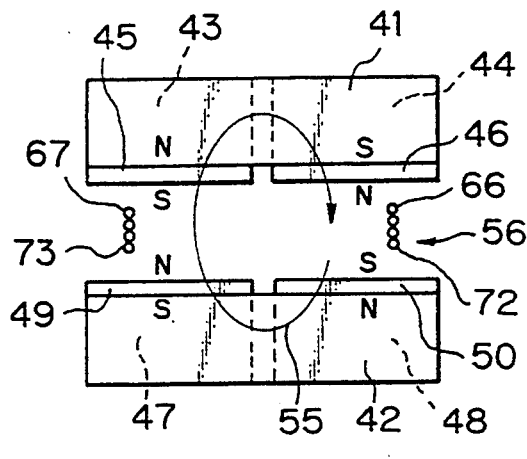
FIG. 10 is an A-arrow view of FIG. 8.
Figure 11:
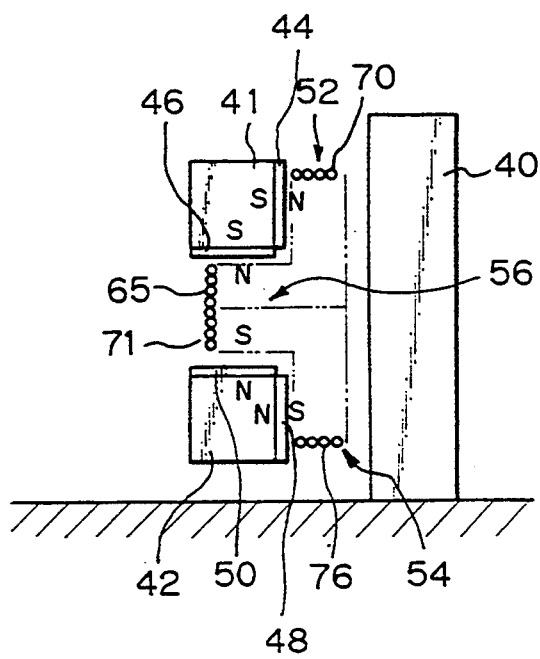
FIG. 11 is a B-arrow view of FIG. 8.
Figure 13:
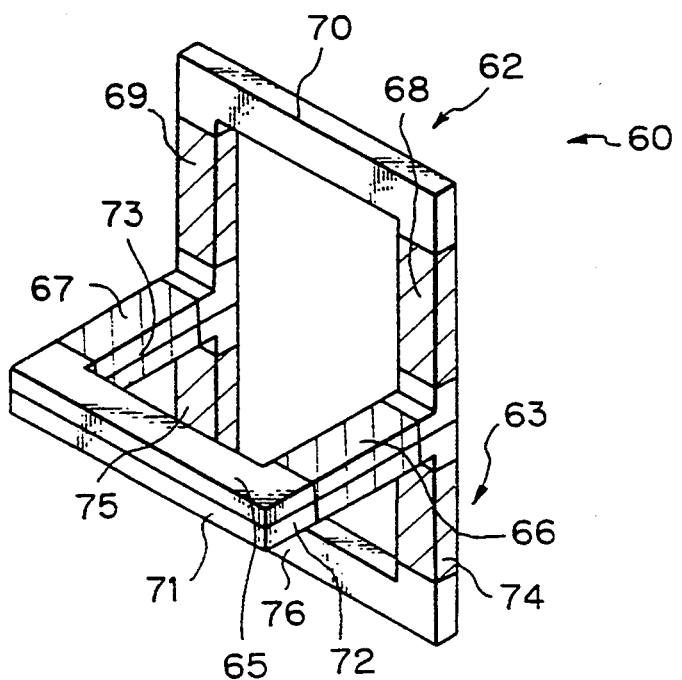
FIG. 13 is a perspective view showing a construction for explaining coil shown in FIG. 8.

Further, more concrete embodiments of the present invention will be described with reference to the drawings that will be illustrated hereinafter. FIG. 8 is a perspective view of a voice coil motor showing a first embodiment. FIG. 9 is a plan view of a disk drive having the voice coil motor shown in FIG. 8, which is partly cut away. FIG. 10 is an A-arrow view of FIG. 8. FIG. 11 is a B-arrow view of FIG. 8. FIG. 11 is a C-arrow view of FIG. 9. FIG. 13 shows a construction for explaining the coil shown in FIG. 8.

First, an overall construction of a voice coil motor for a disk drive having a voice coil of the first embodiment will be described in reference to FIG. 9. In FIG. 9, 30 denotes an enclosure. A disk 31 which is rotated by a spindle motor that is not shown is placed on the base portion of the enclosure 30.

32 denotes an actuator shaft mounting on the base of the enclosure 30. An actuator 33 is attached to the actuator shaft 32 in a rotatable manner. From one rotation end of the actuator 33, a head arm 34 extends toward a recording surface of the disk 31. The tip of the head arm 34 is provided with a magnetic head 36 that reads or writes data from or to the disk 31 via a head suspension 35.

On the other hand, the other rotation end of the actuator 33 is provided with a voice coil motor 37 of this embodiment.

Next, the voice coil motor 37 of the first embodiment will be described with reference to FIGS. 8 and 10 to 13. 40 denotes a first yoke which is substantially perpendicular to the rotation plane of the actuator 33, shaped substantially like an arc with the actuator shaft as a center, and opposed to the rotation range of the actuator 33 in the vicinity of the rotation end of the actuator 33. In the magnetic disk drive of this embodiment, the enclosure 30 has a notch in which the first yoke 40 is installed as part of the enclosure 30. This results in a compactly designed disk drive.

A second yoke 41 is opposed to the upper part of the surface of the first yoke 40 facing the actuator 33 with a space between. A third yoke 42 is opposed to the lower part of the surface of the first yoke 40 facing the actuuator 33 and separated from the first and second yokes 40 and 41.

A first magnet 43 and a second magnet 44 are placed on the surface of the second yoke 41 facing the first yoke 40. A third magnet 45 and fourth magnet 46 are placed on the surface of the second yoke 41 facing the third yoke 42.

A fifth magnet 47 and a sixth magnet 48 are placed on the surface of the third yoke 42 facing the first yoke 40. A seventh magnet 49 and eighth magnet 50 are placed on the surface of the third yoke 42 facing the second yoke 41.

The first yoke 40 and second yoke 41, and the first magnet 43 and second magnet 44 make up a first magnetic circuit 51. A first magnetic gap 52 is created between the first magnet 43 and second magnet 44, and the first yoke 40. The first yoke 40 and third yoke 42, and the fifth magnet 47 and sixth magnet 48 make up a second magnetic circuit 53 (not shown). A second magnetic gap 54 is created between the fifth magnet 47 and sixth magnet 48, and the first yoke 40. The second yoke 41 and third yoke 42, the third magnet 45, fourth magnet 46, seventh magnet 49, and eighth magnet 50 make up a third magnetic circuit 55. A third magnetic gap 56 is created between the third magnet 45 and fourth magnet 46, and the seventh magnet 49 and eighth magnet 50.

Next, a coil 60 in a voice coil motor of the first embodiment will be described. The coil 60 of this embodiment is attached to the other end of an actuator 33 using a bracket 61 (See FIG. 9). As shown in FIG. 13, the coil 60 is an integrated unit of a substantially L-shaped first coil 62 and a substantially L-shaped second coil 63.

In the first coil 62, 65 denotes a first portion that extends substantially perpendicularly to the rotation radius of the actuator 33 between the second yoke 41 and the third yoke 42. 66 denotes a second portion that extends from one end of the first portion 65 through the third magnetic gap 56. 67 denotes a third portion that extends from the other end of the first portion 65 through the third magnetic gap 56. 68 denotes a forth portion that extends from the second portion 66 through the first magnetic gap 52. 69 denotes a fifth portion that extends from the third portion 67 through the first magnetic gap 52. 70 denotes a sixth portion that bridges between the fourth portion 68 and the fifth portion 69.

In the second coil 63, 71 denotes a first portion that extends substantially perpendicularly to the rotation radius of the actuator 33 along the first portion 65 of the first coil 62. 72 denotes a second portion that extends from one end of the first portion 71 along the second portion 66 of the first coil 62 through the third magnetic gap 56. 73 denotes a third portion that extends from the other end of the first portion 71 along the third portion 67 of the first coil 62 through the third magnetic gap 56. 74 denotes a fourth portion that extends from the second portion 72 through the second magnetic gap 54. 75 denotes a fifth portion that extends from the third portion 73 through the second magnetic gap 54. 76 denotes a sixth portion that bridges between the fourth portion 74 and the fifth portion 75.

Next, the operation of the foregoing construction will be described. When a control circuit that is not shown supplies current to the first coil 62 and second coil 63, a thrust occurs at the portions located in the first magnetic gap 52 and third magnetic gap 56 (hatched parts in FIG. 13); that is, the second portion 66, third portion 67, fourth portion 68, and fifth portion 69, in the first coil 62. In the second coil 63, a thrust occurs at the portions located in the second magnetic gap 54 and third magnetic gap 56; that is, the second portion 72, third portion 73, fourth portion 74, and fifth portion 75.

Due to the thrust occurring in the coil 60, the actuator 33 rotates in either direction by means of the actuator shaft 32. The magnetic head 36 moves to a target track of the rotating disk 31, then reads or writes data from or to the disk 31.

According to the aforesaid construction, each of the first coil 62 and second coil 63 has six portions. The thrust occurs at four of the six portions. That is, thrust occurs at about 67% of an overall length of each coil. Thus, the use efficiency of a coil is much higher than that in the prior arts.

Figure 14:
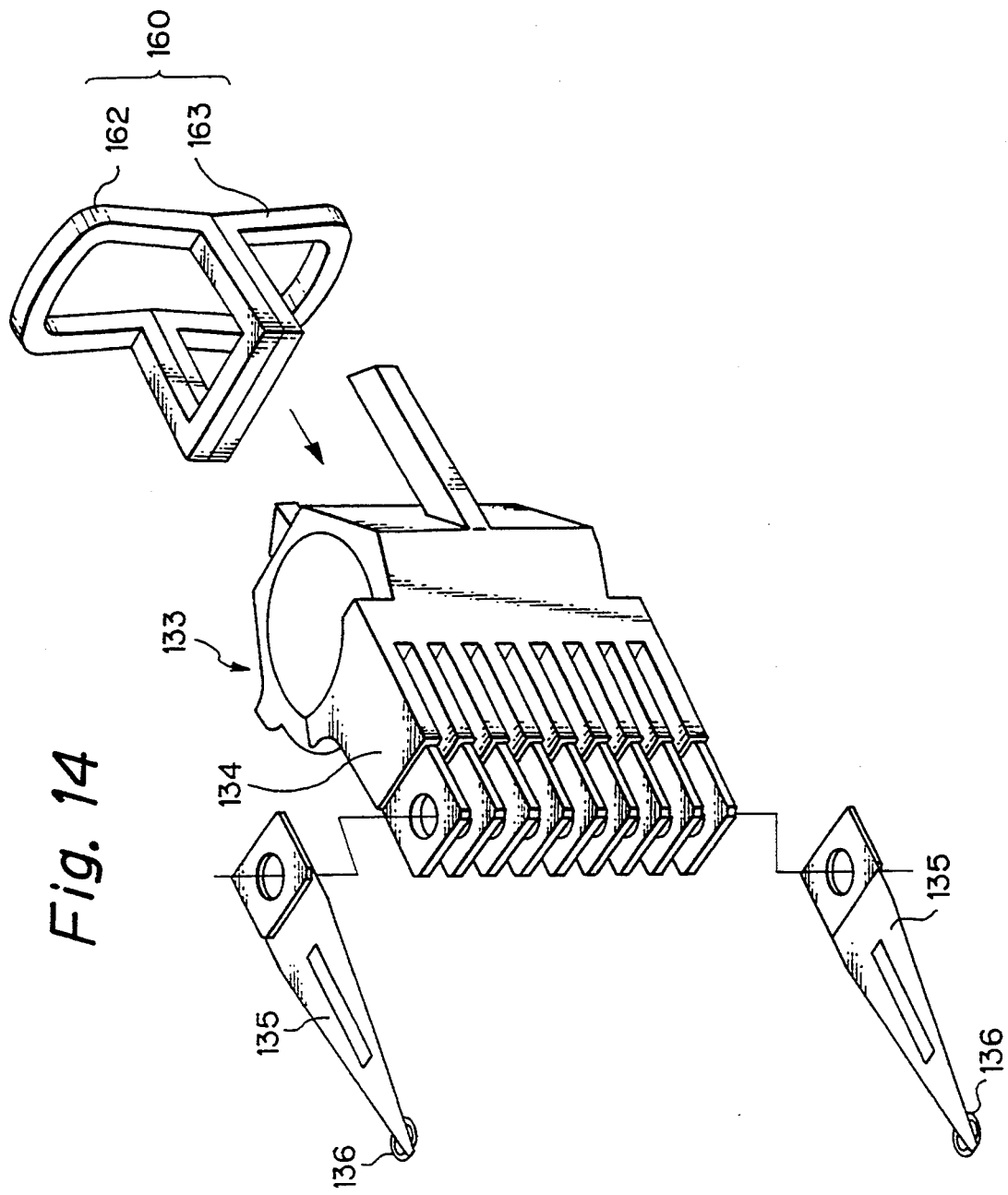
FIG. 14 is an exploded perspective view showing an actuator and a coil of a voice coil motor of a first embodiment.
Figure 15:
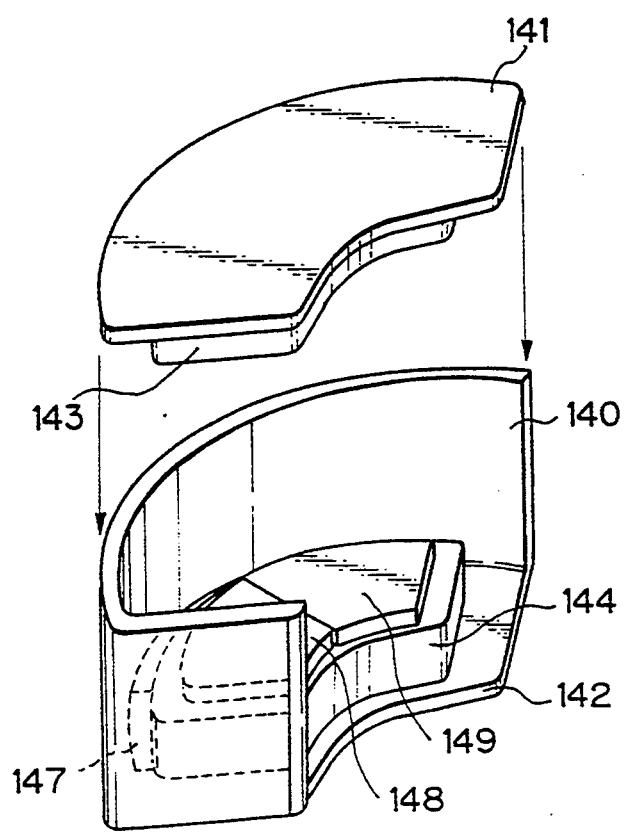
FIG. 15 is an exploded perspective view showing yokes and magnets of a first embodiment.
Figure 16:
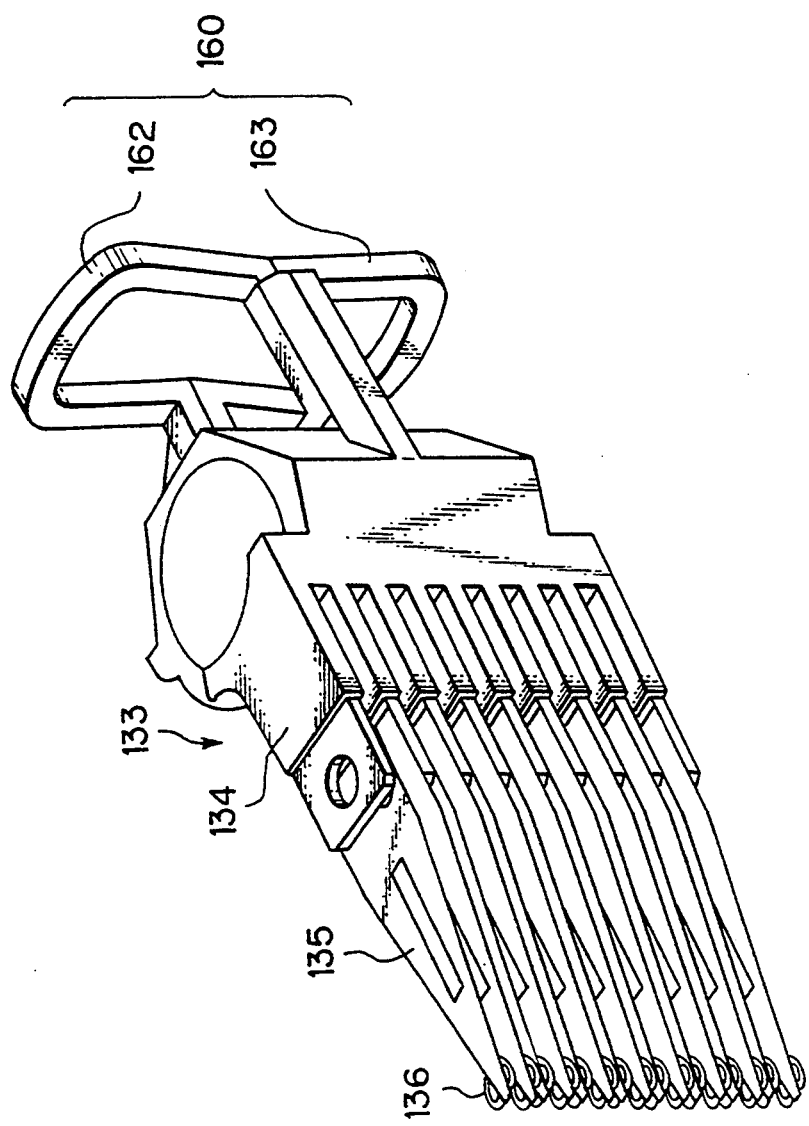
FIG. 16 is an assembled perspective view showing an actuator and a coil of a first embodiment.

Here, in order to make the characteristics of the first embodiment understood more clearly, the more detailed construction of an actuator and a voice coil motor will be illustrated in FIGS. 14 to 16.

To be more specific, FIG. 14 is an exploded perspective view showing various components; FIG. 15 is an exploded perspective view showing yokes and magnets constituting a magnetic circuit; and FIG. 16 is an assembled perspective view showing the condition in which an actuator and a coil are incorporated together. In this case, an example, in which a plurality of heads 135 are provided on both surfaces of the respective disks, is illustrated representatively.

In FIGS. 14 and 16, and actuator 133 is mainly constituted by a plurality of heads 136, a plurality of head suspensions 135 for suspending the respective heads 136, and head arms 134 for supporting the respective head suspensions 135. The actuator 133 is fixed on an actuator shaft (not shown) rotatably. On the opposite side of the actuator 133 in respect to the actuator shaft, and integrated coil 160, which is formed by incorporating a first coil 162 and a second coil 163 with each other, is provided. Each of first and second coils 162, 163 takes a substantially L-shaped form. Namely, one coil component located in horizontal direction and another coil component located in vertical direction are combined into one L-shaped coil. Accordingly, the common portions of two coil portions can be omitted, and therefore the L-shaped coil includes six portions, instead of eight portions.

When the integrated coil 160 is located inside a magnetic gap which is constituted by a plurality of magnets 147, 148 and 149, etc., and by a plurality of yokes 140 to 144, as shown in FIG. 15, four portions of six portions in each of L-shaped coils 162, 163 provide thrust. Consequently, the portion of about 67% ($\approx 4/6$) of a coil 60 can contribute to a magnetic circuit efficiency.

Figure 17:
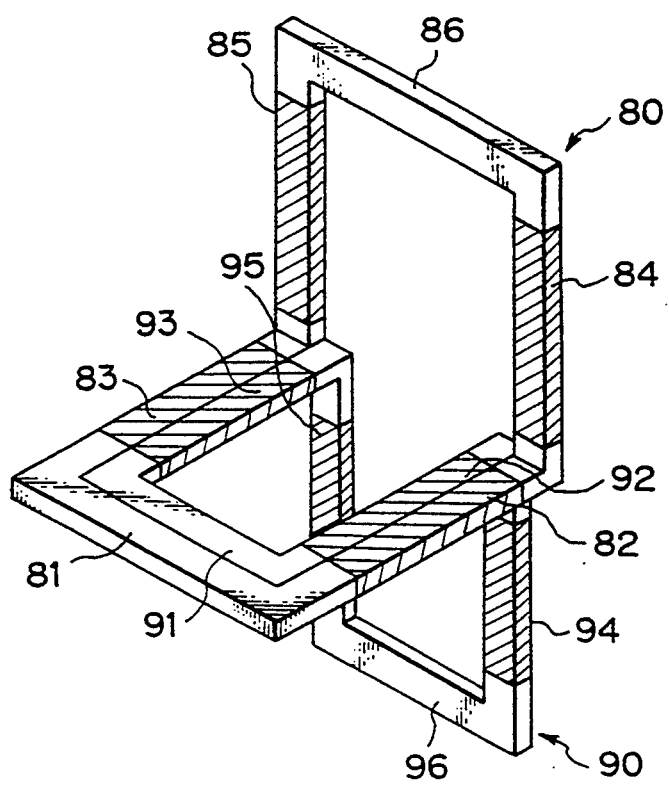
FIG. 17 is a perspective view of a voice coil motor showing a second embodiment according to the present invention.

Further, a second embodiment of the present invention will be described with reference to FIG. 17. The magnetic circuit of this embodiment has the same construction as the one of the first embodiment. The construction of the second embodiment is different from that of the first embodiment in respect to the shape of a coil. Therefore, components other than a coil will not be described.

First, a first coil 80 will be described. In the first coil 80, a first portion 81 is mounted on an actuator body to be substantially perpendicular to the rotation radius of the actuator. A second portion 82 extends from one end of the first portion 81 in substantially the same direction of the rotation radius of the actuator but in the direction of departing from the rotation center of the actuator. A third portion 83 extends from the other end of the first portion 81 in substantially the same direction as the second portion 82. The second portion 82 and third portion 83 are arranged in the third magnetic gap for a magnetic circuit. A fourth portion 84 extends from the tip of the second portion 82 substantially perpendicularly to the rotation plane of the actuator. A fifth portion 85 extends from the tip of the third portion 83 in substantially the same direction as the fourth portion 84. A sixth portion 86 arranged in the first magnetic gap for a magnetic circuit bridges between the tip of the fourth portion 84 and the tip of the fifth portion 85. The first coil 80 is shaped substantially like a letter L.

Next, a second coil 90 will be described. A first portion 91 is arranged portion by portion with the first portion 81 of the first coil 80. A second portion 92 extends from one end of the first coil 91 to run portion by portion with the second portion 82 of the first coil 80. A third portion 93 extends from the other portion of the first coil 91 to run portion by portion with the third portion 83 of the first coil 80. The second portion 92 and third portion 93 are arranged in the third magnetic gap for a magnetic circuit. A fourth portion 94 extends from the tip of the second portion 92 in the opposite direction of the fourth portion 84 of the first coil 80.

A fifth portion 95 extends from the tip of the third portion 93 in the opposite direction of the fifth portion 85 of the first coil 80.

A sixth portion 96 bridges between the fourth portion 94 and fifth portion 95 in the second magnetic gap for a magnetic circuit. The second coil 90 is shaped substantially like a letter L.

Next, the operation of the foregoing construction will be described. When a control circuit that is not shown supplies a current to the first coil 80 and second coil 90, a thrust occurs at the portions located in the first and third magnetic gaps (hatched parts in FIG. 17); that is, the second side 82, third side 83, fourth portion 84, and fifth portion 85, in the first coil 80. In the second coil 90, a thrust occurs at the portions located in the second and third magnetic gaps (hatched parts in FIG. 17; that is, the second portion 92, third portion 93, fourth portion 94, and fifth portion 95.

Due to the thrust occurring at the sides, the actuator reciprocates with the actuator shaft as a center. The magnetic head moves to a target track of a rotating disk, then reads or writes data from or to the disk.

According to the aforesaid construction, a thrust occurs at four of the six portions of each of the first coil 80 and second coil 80. That is to say, the thrust occurs at about 67% of an overall length of each coil. Thus, the use efficiency of a coil is much higher than that in the prior art. In this embodiment, the second portion 82 and third portion 83 of the first coil 80 are arranged portion by portion with the second portion 92 and third portion 93 of the second coil 90. Thereby, a distance between magnetic gaps becomes narrower than that in the first embodiment. This results in a larger thrust.

The present invention is not restricted to the first and second embodiments. In the aforesaid embodiments, the present invention is implemented in a magnetic disk drive. This invention can, needless to say, apply to an optical disk drive.

As described above, according to the present invention, a coil in a voice coil motor for a disk drive can be utilized with higher efficiency (e.g., 67%) than that of prior arts (e.g., 50%).

Figure 18:
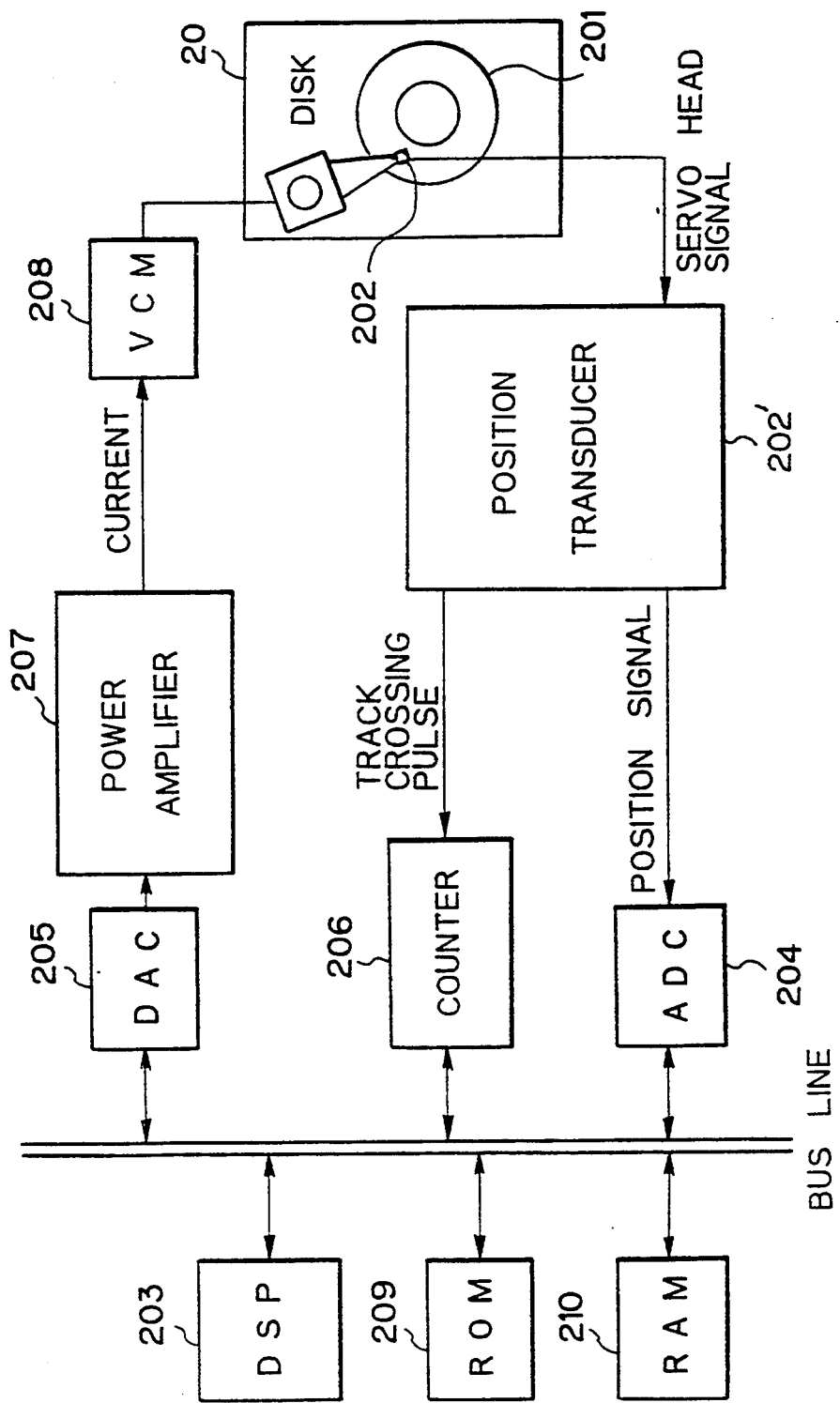
FIG. 18 is a block diagram showing a digital servo system for head positioning.

In order to facilitate understanding of the seek operation, etc., of magnetic heads, a digital servo system for head positioning is illustrated in FIG. 18.

FIG. 18 shows the configuration of the digital servo system for head positioning of the magnetic disk drives 200. The servo pattern is pre-recorded on the servo disk surface for dedicated servo systems, and also on a part of the sectors of the data disk surface for sector servo systems, including a plurality of disks 20. This servo pattern (servo head signal) output from the head 202 is transformed to analog position signals and track crossing pulses by the position transducer 202'.

A host controller consists of the digital signal processor (DSP) 203 analog-to-digital converter (ADC) 204 digital-to-analog converter (DAC) 205 and counter 206. The drive signal output from the controller is converted to a current by a power amplifier 207 and the current drives the voice coil motor (VCM) 207.

The servo system for head positioning is connected to the host controller through a bus line. Further, a ROM 207 and a ROM 210 are also connected to the bus line.

In this head positioning system, each head 202 is adapted to be positioned on the target track of disk surface rapidly, so that the accurate read/write operations can be performed at high speed.

I claim:

1. A disk drive comprising a voice coil motor for driving an actuator, said voice coil motor including:
   a substantially L-shaped coil having a first portion that is mounted on an actuator body to be substantially perpendicular to a rotation radius defined by a longitudinal axis of said actuator, a second portion that extends from one end of said first portion in substantially the same direction as the rotation radius of said actuator but in the direction of departing from the rotation center of said actuator, a third portion that extends from the other end of the first portion in substantially the same direction as said second portion, a fourth portion that extends from the tip of the second portion substantially perpendicularly to the rotation plane of said actuator, a fifth portion that extends from the tip of said third portion in substantially the same direction as said fourth portion, and a sixth portion that bridges between the tip of said fourth portion and the tip of said fifth portion; and
   a magnetic assembly having a first magnetic air gap, in which said fourth and fifth portions are arranged, for generating a horizontal magnetic field and a second magnetic air gap, in which second and third portions are arranged, for generating a vertical magnetic field.

2. A disk drive as set forth in claim 1, wherein a first pair of parallel portions of a first group of said first to third portions and a second pair of parallel portions of a second group of said fourth through sixth portions are connected to each other such that said first group is connected to said second group at approximately a right angle, wherein said first and second pair of parallel portions among a total of six portions of said coil are constructed to be utilized effectively for said magnetic field.

3. A disk drive comprising a voice coil motor for driving an actuator having a rotation radius defined by a longitudinal axis of the actuator, said voice coil motor including:
   a first substantially L-shaped coil having a first portion that is mounted on an actuator body to be substantially perpendicular to the rotation radius of said actuator, a second portion that extends from one end of said first portion in substantially the same direction as the rotation radius of said actuator but in the direction of departing from the rotation center of said actuator, a third portion that extends from the other end of the first portion in substantially the same direction as said second portion, a fourth portion that extends from the tip of the second portion substantially perpendicularly to the rotation plane of said actuator, a fifth portion that extends from the tip of said third portion in substantially the same direction as said fourth portion, and a sixth portion that bridges between the tip of said fourth portion and the tip of said fifth portion;
   a second substantially L-shaped coil having a first portion that is arranged back to back with said first portion of said first coil, a second portion that extends from one end of said first portion to run back to back with said second portion of said first coil, a third portion that extends from the other end of said first portion to run back to back with said third portion of said first coil, a fourth portion that extends from the tip of said second portion in the opposite direction of said fourth portion of said first coil, a fifth portion that extends from the tip of said third portion in the opposite direction of said fifth portion of said first coil, and a sixth portion that bridges the tips of said fourth portion and said fifth portion; and a magnetic assembly having a first magnetic air gap in which said fourth and fifth portions of said first coil are arranged, a second magnetic air gap in which said fourth and fifth portions of said second coil are arranged, and a third magnetic air gap in which said second and third portions of said first coil, and said second and third portions of said second coil are arranged.

4. A disk drive as set forth in claim 3, wherein said first portion of either one of said substantially L-shaped first and second coils is shorter than the first portion of the other one of said L-shaped first and second coils, and wherein said first and second and third portions of said L-shaped first and second coils are arranged in approximately the same plane such that said second portion of said first substantially L-shaped coil does not run back to back with said second portion of said second substantially L-shaped coil and said third portion of said first substantially L-shaped coil does not run back to back with said third portion of said second substantially L-shaped coil.

5. A disk drive comprising a voice coil motor for driving an actuator having a rotation radius defined by a longitudinal axis of the actuator, said voice coil motor including:

a first substantially L-shaped coil having a first portion that is mounted on an actuator body to be substantially perpendicular to the rotation radius of said actuator, a second portion that extends from one end of said first portion in substantially the same direction as the rotation radius of said actuator but in the direction of departing from the rotation center of said actuator, a third portion that extends from the other end of said first portion in substantially the same direction as said second portion, a fourth portion that extends from the tip of said second portion substantially perpendicularly to the rotation plane of said actuator, a fifth portion that extends from the tip of said third portion in substantially the same direction as said fourth portion, and a sixth portion that bridges between the tip of said fourth portion and the tip of said fifth portion;

a second substantially L-shaped coil having a first portion that is arranged portion by portion with said first portion of said first coil, a second portion that extends from one end of said first portion to run portion by portion with said second portion of said first coil, a third portion that extends from the other end of said first coil to run portion by portion with said third portion of said first coil, a fourth portion that extends from the tip of said second portion in the opposite direction of said fourth portion of said first coil, a fifth portion that extends from the tip of said third portion in the opposite direction of said fifth portion of the first coil, and a sixth portion that bridges between the tips of said fourth portion and said fifth portion; and a magnetic assembly having a first magnetic air gap in which said sixth portion of said first coil is arranged, a second magnetic air gap in which said sixth portion of said second coil is arranged, and a third-magnetic air gap in which said second and third portions of said first coil, and said second and third portions of said second coil are arranged.

6. A disk drive as set forth in claim 3, which comprises:

a first yoke that lies substantially perpendicularly to the rotation plane of said actuator and faces the rotation range of said actuator in the vicinity of the rotation end of said actuator;

a second yoke that is opposed to the upper part of the surface of said first yoke facing said actuator with a space between;

a third yoke that is opposed to the lower part of the surface of said first yoke facing said actuator with a space between and separated from said second yoke;

first and second magnets that are placed on the surface of said second yoke facing said first yoke;

third and fourth magnets that are placed on the surface of said second yoke facing said third yoke;

fifth and sixth magnets that are placed on the surface of said third yoke facing said first yoke;

seventh and eighth magnets that are placed on the surface of said third yoke facing said second yoke;

a first magnetic air gap for a first magnetic assembly that is formed by said first yoke and said second yoke, and said first and second magnets;

a second magnetic air gap for a second magnetic assembly that is formed by said first yoke and said third yoke, and said fifth and sixth magnets; and a third magnetic air gap for a third magnetic assembly that is formed by said second yoke and said third yoke, said third and fourth magnets and said seventh and eight magnets.

7. A disk drive as set forth in claim 5, which comprises:

a first yoke that lies substantially perpendicularly to the rotation plane of said actuator and faces the rotation range of said actuator in the vicinity of the rotation end of said actuator;

a second yoke that is opposed to the upper part of the surface of said first yoke facing said actuator with a space between;

a third yoke that is opposed to the lower part of the surface of said first yoke facing said actuator with a space between and separated from said second yoke;

first and second magnets that are placed on the surface of said second yoke facing said first yoke;

third and fourth magnets that are placed on the surface of said second yoke facing said third yoke;

fifth and sixth magnets that are placed on the surface of said third yoke facing said first yoke;

seventh and eighth magnets that are placed on the surface of said third yoke facing said second yoke;

a first magnetic air gap for a first magnetic assembly that is formed by said first yoke and said second yoke, and said first and second magnets;

a second magnetic air gap for a second magnetic assembly that is formed by said first yoke and said third yoke, and said fifth and sixth magnets; and a third magnetic air gap for a third magnetic assembly that is formed by said second yoke and said third yoke, and said third and fourth magnets and said seventh and eighth magnets.

* * * * *

UNITED STATES PATENT AND TRADEMARK OFFICE
CERTIFICATE OF CORRECTION

PATENT NO. : 5,448,437
DATED : September 5, 1995
INVENTOR(S) : Naotoshi Katahara It is certified that error appears in the above-indentified patent and that said Letters Patent is hereby corrected as shown below:

Column 2, line 8, delete "lower yoke 15" and insert --lower yoke 12--.

Column 2, line 8, delete "upper yoke 12" and insert --upper yoke 15--.

Column 3, line 9, delete "voice coil" (first occurrence) and insert --voice coil motor--.

Column 3, line 25, delete "portion" and insert --portions--.

Column 3, line 28, delete "angle" and insert --angles--.

Column 3, line 61, delete "portions" and insert --portions of--.

UNITED STATES PATENT AND TRADEMARK OFFICE
CERTIFICATE OF CORRECTION

PATENT NO. : 5,448,437
DATED : September 5, 1995
INVENTOR(S) : Naotoshi Katahara It is certified that error appears in the above-indentified patent and that said Letters Patent is hereby corrected as shown below:

Column 4, line 15, delete "portions" (second occurrence) and insert --portions--.

Column 4, line 51, delete "time" and insert --them--.

Figure 12:
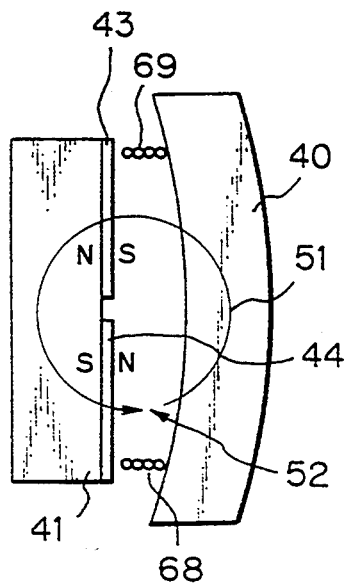
FIG. 12 is a C-arrow view of FIG. 8.

Column 6, line 14, delete "FIG. 11" (second occurrence) and insert --FIG. 12--.

Column 6, line 15, delete "FIG. 9" and insert --FIG. 8--.

Column 7, line 20, delete "forth" and insert --fourth--.

Column 8, line 10, delete "and" and insert --an--.

Column 12, line 37, delete "eight" and insert --eighth--.

Signed and Sealed this

First Day of October, 1996

*Attest:*

BRUCE LEHMAN

*Attesting Officer*   *Commissioner of Patents and Trademarks*